US008312612B2

(12) United States Patent
Gakovic

(10) Patent No.: US 8,312,612 B2
(45) Date of Patent: Nov. 20, 2012

(54) REFURBISHED PUNCH TIP AND METHOD FOR MANUFACTURE AND REFURBISHING

(75) Inventor: Luka Gakovic, Victor, NY (US)

(73) Assignee: Blue Sky Vision Partners, LLC, Rochester, NY (US)

( * ) Notice: Subject to any disclaimer, the term of this patent is extended or adjusted under 35 U.S.C. 154(b) by 342 days.

(21) Appl. No.: 12/796,997

(22) Filed: Jun. 9, 2010

(65) Prior Publication Data

US 2010/0239698 A1 Sep. 23, 2010

Related U.S. Application Data

(63) Continuation-in-part of application No. 11/379,679, filed on Apr. 21, 2006, now Pat. No. 7,913,369, which is a continuation of application No. 10/320,331, filed on Dec. 16, 2002, now Pat. No. 7,033,156.

(60) Provisional application No. 60/371,816, filed on Apr. 11, 2002, provisional application No. 61/186,399, filed on Jun. 12, 2009.

(51) Int. Cl.

| | |
|---|---|
| ***B29C 43/02*** | (2006.01) |
| ***B29C 43/04*** | (2006.01) |
| ***B30B 11/02*** | (2006.01) |
| ***B22D 19/10*** | (2006.01) |

(52) U.S. Cl. .......... 29/458; 29/730; 29/623.1; 29/149.5; 29/401; 29/445; 425/78; 425/355

(58) Field of Classification Search .................... 100/35, 100/39; 29/402.01, 402.03–402.08, 402.12–402.17, 29/402.19

See application file for complete search history.

(56) References Cited

U.S. PATENT DOCUMENTS

| | | | | | |
|---|---|---|---|---|---|
| 2,360,528 | A | * | 10/1944 | Talmage | 419/66 |
| 2,512,033 | A | * | 6/1950 | James | 408/226 |
| 2,562,876 | A | * | 8/1951 | Baeza | 425/78 |
| 2,582,325 | A | * | 1/1952 | Gleitz et al. | 57/130 |
| 2,775,859 | A | * | 1/1957 | Gleitz | 57/130 |
| 3,431,628 | A | * | 3/1969 | Worst et al. | 29/450 |
| 3,524,220 | A | * | 8/1970 | Davison | 425/78 |
| 3,664,784 | A | | 5/1972 | Sibley | |
| 3,671,157 | A | * | 6/1972 | Smith | 425/78 |
| 3,684,784 | A | * | 8/1972 | Marze | 525/60 |
| 3,822,974 | A | * | 7/1974 | DeSantis et al. | 425/78 |
| 3,842,646 | A | * | 10/1974 | Kuhn | 72/354.8 |
| 4,115,911 | A | * | 9/1978 | Poole et al. | 29/402.12 |
| 4,147,489 | A | * | 4/1979 | Milburn et al. | 425/355 |

(Continued)

FOREIGN PATENT DOCUMENTS

EP 1075885 8/2000

(Continued)

OTHER PUBLICATIONS

File history as of Jul. 21, 2010 for U.S. Appl. No. 11/379,679.

(Continued)

*Primary Examiner* — Derris Banks
*Assistant Examiner* — Anthony Green
(74) *Attorney, Agent, or Firm* — George R. McGuire; Bond Schoeneck & King

(57) ABSTRACT

Disclosed is a method and apparatus for the refurbishing of compaction tooling components, particularly the tips and heads of compaction punches.

12 Claims, 9 Drawing Sheets

U.S. PATENT DOCUMENTS

| | | | | | |
|---|---|---|---|---|---|
| 4,153,399 | A * | 5/1979 | DeSantis | 425/78 |
| 4,205,423 | A * | 6/1980 | Poole et al. | 29/402.11 |
| 4,347,051 | A * | 8/1982 | DeSantis | 425/78 |
| 4,353,155 | A * | 10/1982 | Hillebrand et al. | 419/5 |
| 4,380,473 | A * | 4/1983 | Lichtinghagen | 419/41 |
| 4,443,171 | A * | 4/1984 | Dixon | 425/78 |
| 4,456,445 | A * | 6/1984 | DeSantis et al. | 425/78 |
| 4,573,895 | A * | 3/1986 | DeSantis et al. | 425/78 |
| 4,614,453 | A * | 9/1986 | Tsuno et al. | 403/30 |
| 4,690,791 | A * | 9/1987 | Edmiston | 264/122 |
| 4,697,325 | A * | 10/1987 | Kamigaito et al. | 29/447 |
| 4,719,074 | A * | 1/1988 | Tsuno et al. | 419/5 |
| 4,794,894 | A * | 1/1989 | Gill | 123/90.61 |
| 4,810,585 | A * | 3/1989 | Oda et al. | 428/469 |
| 4,848,286 | A * | 7/1989 | Bentz | 123/90.61 |
| 4,854,025 | A * | 8/1989 | Oda et al. | 29/889.2 |
| 4,962,002 | A * | 10/1990 | Yoshida et al. | 428/609 |
| 5,036,581 | A * | 8/1991 | Ribordy et al. | 29/730 |
| 5,122,319 | A * | 6/1992 | Watanabe et al. | 264/109 |
| 5,294,382 | A * | 3/1994 | Goldberger | 264/450 |
| 5,365,661 | A * | 11/1994 | Mizuno et al. | 29/889.21 |
| 5,409,165 | A * | 4/1995 | Carroll et al. | 239/88 |
| 5,507,896 | A * | 4/1996 | Yoshimura et al. | 156/89.12 |
| 5,628,047 | A * | 5/1997 | Hiroyoshi | 419/62 |
| 5,725,816 | A * | 3/1998 | Sagawa et al. | 264/102 |
| 5,770,136 | A * | 6/1998 | Huang | 264/101 |
| 5,774,971 | A * | 7/1998 | Manetta et al. | 29/458 |
| 5,851,568 | A * | 12/1998 | Huang | 425/356 |
| 5,930,581 | A * | 7/1999 | Born et al. | 419/5 |
| 5,994,250 | A * | 11/1999 | Suzuki et al. | 501/87 |
| 6,585,507 | B1 * | 7/2003 | Kalidindi | 425/344 |
| 6,612,826 | B1 * | 9/2003 | Bauer et al. | 425/135 |
| 6,755,110 | B2 * | 6/2004 | Rosene et al. | 83/686 |
| 6,758,386 | B2 * | 7/2004 | Marshall et al. | 228/120 |
| 6,868,778 | B2 * | 3/2005 | Knoth et al. | 100/214 |
| 6,872,069 | B2 * | 3/2005 | Starkey | 425/556 |
| 6,896,678 | B2 * | 5/2005 | Tweardy | 606/916 |
| 7,032,812 | B2 * | 4/2006 | Ostini | 234/43 |
| 7,033,156 | B2 * | 4/2006 | Gakovic | 425/78 |
| 7,165,757 | B2 * | 1/2007 | Vincent | 251/318 |
| 7,214,046 | B2 * | 5/2007 | Gakovic | 425/78 |
| 7,252,495 | B2 * | 8/2007 | Chiang | 425/195 |
| 7,255,550 | B2 * | 8/2007 | Chiang | 425/193 |
| 7,278,464 | B2 * | 10/2007 | Vincent | 164/437 |
| 7,361,301 | B2 * | 4/2008 | Bauer et al. | 419/66 |
| 7,455,509 | B2 * | 11/2008 | Knoth et al. | 425/78 |
| 2002/0189420 | A1 * | 12/2002 | Rosene et al. | 83/699.41 |
| 2006/0193937 | A1 * | 8/2006 | Gakovic | 425/352 |

FOREIGN PATENT DOCUMENTS

| | | |
|---|---|---|
| EP | 0773201 | 9/2000 |
| JP | 61041515 | 2/1986 |
| JP | 61058707 | 3/1986 |
| JP | 62216711 | 9/1987 |
| JP | 63058846 | 3/1988 |
| JP | 61248712 | 5/1988 |
| JP | 63126682 | 5/1988 |
| JP | 02151398 | 6/1990 |
| JP | 07003303 | 1/1995 |
| JP | 10061765 | 4/1998 |
| WO | WO 03086727 | 10/2003 |

OTHER PUBLICATIONS

File history as of Jul. 21, 2010 for U.S. Appl. No. 60/371,816.

File history as of Jul. 21, 2010 for US Patent 7,033,156.

File history as of Jul. 21, 2010 for US Patent 7,214,046.

The international search report for PCT/US03/10752 corresponding to US Patent 7,033,156.

The application as filed for U.S. Appl. No. 61/186,399.

CTS; 1-800-670-4667; c. 1998-2003 Chromatography Technology Service Corp.; Sapphire or ceramic plungers for HPLC pumps.

Ceramics Industrial Ceramics Division; ceramic plungers for piston pump; CUMI (Date Unknown).

National Oilwell; plungers and piston pumps. plungers utilize materials such as high quality ceramics; ceramic plungers; Fluid King; (Date Unknown).

Maret SA, Rue de Croix 43, CH-2014 Bole, Switzerland; ceramic components; advancedceramic, ruby, and sappire components are supplied for use in pistons, check valves, and rotors and stators. Reader Service #190 (Date Unknown).

Sapphire Engineering, Inc., 53 Portside Drivel, Pocasset, MA 02559; 508-563-5531; ceramic pistons (Date Unknown).

Fluid Metering, Inc., 5 Aerial Way, Suite 500, Syosset, NY 11791; 1-800-223-3388; CeramPump Principal of Operation; ceramic piston (Date Unknown).

Maret SA, Rue de Croix 43, CH-2014 Bole, Switzerland; info@maret.ch;Advanced ceramics, ruby and sapphire; pitons; rotary valves. (Date Unknown).

Coors Tek Oklahoma Operations; 450 24th Ave. NW, Norman OK 73069; PlungersNalves/CentriMgal/Packing; (Date Unknown).

EverWear Ceramic Plungers Checkpoint EverWear (Date Unknown).

Ceramic Laser Borers; www.stratamet.com/page3.html; Oct. 5, 2001; Brazing of metal/ceramic bore assemblies.

MarkeTech International, Inc., 4750 Magnnolia St., Port Twonsend WA 98368; .mkt-intl.com/ceramics/brazephotos.htm.; Mar. 4, 2002 C. 1996-2002.

* cited by examiner

REFURBISHED PUNCH TIP AND METHOD FOR MANUFACTURE AND REFURBISHING

This application is a Continuation-in-part of U.S. patent application Ser. No. 11/379,679, and claims priority benefit from all of the following applications: U.S. patent application Ser. No. 11/379,679, filed Apr. 21, 2006, for a "CERAMIC CENTER PIN FOR COMPACTION TOOLING AND METHOD FOR MAKING SAME," by L. Gakovic, which is a Continuation of U.S. patent application Ser. No. 10/320,331 (now U.S. Pat. No. 7,033,156), filed Dec. 16, 2002, for a "CERAMIC CENTER PIN FOR COMPACTION TOOLING AND METHOD FOR MAKING SAME," by L. Gakovic, which also claims the benefit from U.S. Provisional Application No. 60/371,816, filed Apr. 11, 2002 for a "CERAMIC CENTER PIN FOR COMPACTION TOOLING AND METHOD FOR MAKING SAME," by Luka Gakovic, and this application further claims priority from U.S. Provisional Application No. 61/186,399 filed Jun. 12, 2009 by Luka Gakovic, said applications are also hereby incorporated by reference in their entirety.

This invention relates generally to compaction tooling components, and more particularly to a compaction tool, such as a punch, incorporating a tip or other wear surface and the method for manufacturing and refurbishing such a component.

BACKGROUND AND SUMMARY OF THE INVENTION

The embodiments disclosed herein are directed to improvements in the tooling used in compaction equipment and tableting machines, for example, tooling used in the manufacture of components for dry-cell batteries, e.g., various sizes of 1.5 volt (AAA, AA, C, D) and 9 volt batteries used in consumer electronic devices. It will be further appreciated that various aspects of the invention described herein may be suitable for use with well-known compaction tooling and tableting equipment, and particularly to center pins and punches employed in the manufacture of oral pharmaceuticals, etc.

Heretofore, a number of patents have disclosed processes and apparatus for the forming of parts by the compression of unstructured powders, sometimes followed by heat-treating of the compressed part. The relevant portions of these patents may be briefly summarized as follows; and are hereby incorporated by reference for their teachings:

U.S. Pat. No. 5,036,581 of Ribordy et al, issued Aug. 6, 1991, discloses an apparatus and method for fabricating a consolidated assembly of cathode material in a dry cell battery casing. Ribordy further states that in certain types of galvanic dry cell batteries, such as the so-called alkaline type, the battery construction generally consists of a metallic casing or container (usually a suitable steel), an annular mass or mix of cathode material (e.g., a molded mixture of $MnO2$ and graphite) in the casing, a separator membrane (e.g., a paper liner) on the inside surface of the annular molded cathode mix, and an electrolyte as well as an anode material (e.g., a zinc powder) in the form of a central anode core within the separator membrane.

The casing is generally cylindrical, is closed on one end, and is initially open at the other end for receiving the internal components and materials. Good physical contact between the cathode mix and the casing is required so as to provide the proper electrical conduction which is critical to battery performance. Consequently, it would be desirable to provide an improved method and apparatus for the manufacture of a dry cell battery which would result in good physical contact between the cathode mix and the surrounding surfaces of the casing. Further, it would be beneficial if an improved method and apparatus could efficiently provide good contact between the casing and cathode material on a consistent basis in high speed production operations.

U.S. Pat. No. 5,122,319 of Watanabe et al, issued Jun. 16, 1992, discloses a method of forming a thin-walled elongated cylindrical compact for a magnet.

U.S. Pat. No. 4,690,791 of Edmiston, issued Sep. 1, 1987, discloses a process for forming ceramic parts in which a die cavity is filled with a powder material, the powder is consolidated with acoustic energy, and the powder is further compressed with a mechanical punch and die assembly.

U.S. Pat. No. 5,930,581 of Born et al, issued Jul. 27, 1999, discloses a process for preparing complex-shaped articles, comprising forming a first ceramic-metal part, forming a second part of another shape and material, and joining the two parts together.

Referring to FIG. 1, there is illustrated a prior art compaction tool as might be employed for the production of a cylindrically shaped battery component. In use of such a tool in battery manufacturing, the die 20 receives a lower punch 22 that is inserted into the die. The lower punch includes a through-hole in the center thereof that allows a center pin 24 to be inserted therein. The punch and center pin then, in conjunction with the die, form a cavity into which a powder mix employed in battery manufacture can be deposited. Such a powder mix may include wetting agents, lubricating agents, and other proprietary solvents added just before filing the die cavity. Once filled, the cavity is then closed by an upper punch 26 that is inserted into the upper end of the die and the punches are directed toward one another so as to compact the powder material 28 therein. In typical systems, the compaction force is applied by mechanical and/or hydraulic systems so as to compress the powder material and produce a compacted part (e.g., a tablet or a cylindrical component), examples of which are described in the patents incorporated by reference above.

During the compaction process, however, the application of significant compressive forces results in wear to the tips and heads of the punches. This force, associated friction and the nature of the materials being compacted, causes a high level of wear on the compaction tooling, resulting in the frequent need to change out and rework such tooling. Although it is known to employ ceramics in the interior region of the die, to reduce the wear from friction, replaceable or refurbishable tools such as compaction punches, possibly including ceramics have not been successfully employed.

Thus, it is often the case that frequent replacement of punches and center pins continues to be a problem and cost that plagues the powder compaction industry. One prior art method and apparatus for the manufacturing of cylindrical dry cell batteries, which entails the compression of powdered material is described in U.S. Pat. No. 5,036,581 of Ribordy et al., previously incorporated by reference.

The disclosed embodiments are, therefore, directed to both an apparatus that successfully facilitates refurbishment of the wear surfaces of compaction tooling such as punches, as well as the methods of making and refurbishing the same. In particular, the disclosed embodiments include alternatives for affixing a replacement tip component (or head on the opposite end of the punch) to the end of a metal punch; the selection of a particular alternative or method may be dependent upon the use characteristics for the apparatus.

In accordance with an aspect of the disclosed embodiments, there is provided a method of refurbishing a compaction punch, comprising: receiving the used compaction tool for repair; cutting off the worn end of the compaction tool (e.g., tip, head); grinding the remaining body of the compaction tool (e.g., punch), and optionally placing a chamfer or other profile on one or more mating or adjacent surfaces; aligning the punch to permit accurate placement of a replacement piece relative to the remaining body (e.g., insert alignment tool into hollow punch body); placing a replacement end (opt. also with chamfer) in alignment with the remaining body (e.g., position new tip on the alignment tool); clamping the replacement end (e.g., tip) to remaining body; permanently affixing replacement end to remaining body; unclamping and removal of alignment tool; and finish working (e.g., grind/polish) replacement portion of punch.

In accordance with another aspect of the disclosed embodiments, there is provided an assembly for refurbishing a compaction punch, including: a used body for a compaction tool, said body having a worn end removed therefrom; a replacement end to be permanently affixed to the body where the worn end was removed; and an alignment tool, operatively associated with the compaction tool to assure alignment of the replacement end and the body prior to and during the permanent affixing of the body and replacement end.

In accordance with yet another aspect of the disclosed embodiments, there is provided a refurbished compaction tool, comprising: a used body for a compaction tool having a worn end removed therefrom; and a replacement end permanently affixed to the body where the worn end was removed.

One aspect of the invention is based on the discovery of techniques for permanently affixing a replacement tip or surface for a punch that will survive the high compaction stresses of a compaction apparatus. The techniques described herein not only allow for the successful attachment of replacement tips, but also the reworking and replacement thereof, so that only damaged or worn components are replaced, and not the entire punch.

The techniques described herein are advantageous because they can be adapted to any of a number of compaction tooling applications. In addition, they can be used in other similar compaction embodiments to allow for the use and refurbishment of various materials, possibly including ceramic materials, in high-friction environments. An advantage of the disclosed embodiments and methods is reuse of a highly machined part, but only as necessary to replace/refurbish the portion that is worn. The techniques of the invention are advantageous because they provide a range of alternatives, each of which is useful in appropriate situations. As a result of the invention, the life of compaction tooling, particularly including punches, may be significantly increased and/or the cost of reworking and refurbishing the same may be reduced.

Figure 1:
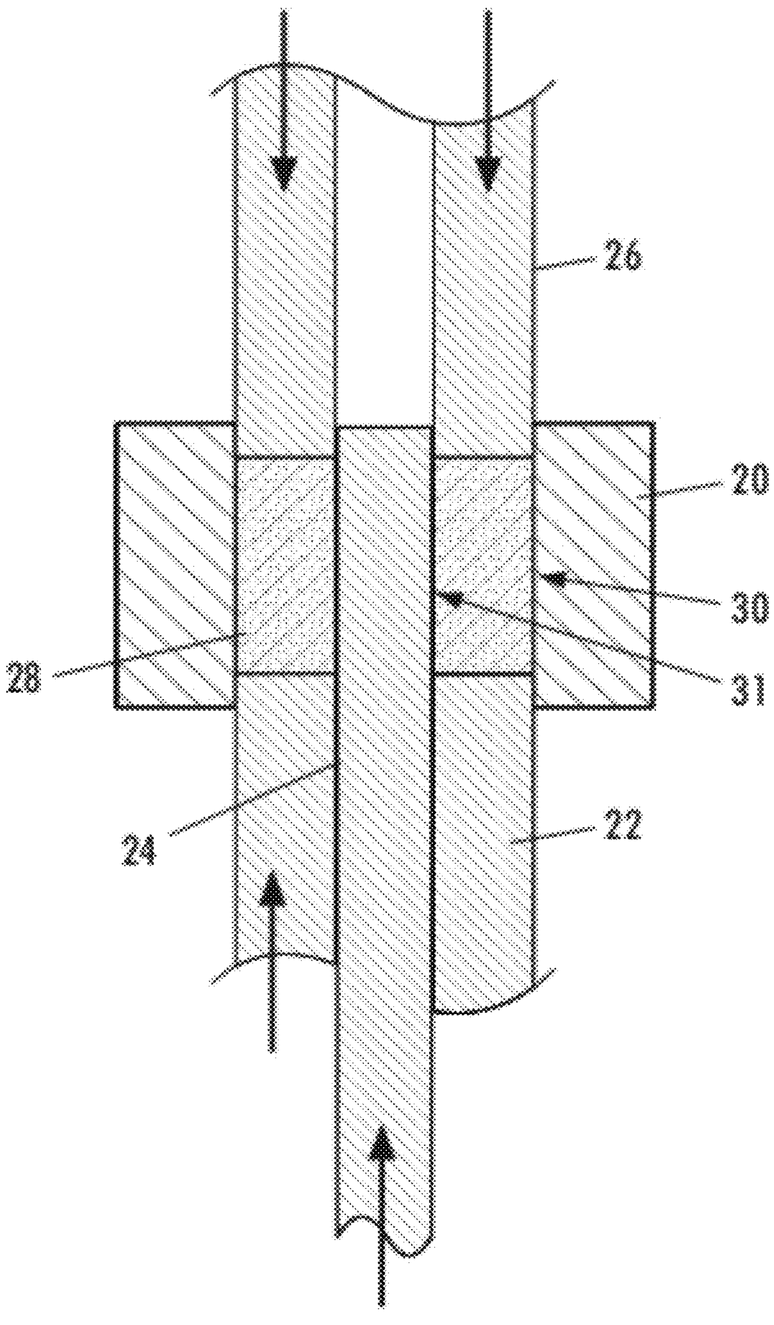
FIG. 1 PRIOR ART
FIG. 1 is a cross-sectional view of a prior art compaction tooling die, punch and center pin set for compaction of a powder material for use in a dry cell battery.

The present invention will be described in connection with a preferred embodiment, however, it will be understood that there is no intent to limit the invention to the embodiments and methods described herein. On the contrary, the intent is to cover all alternatives, modifications, and equivalents as may be included within the spirit and scope of the disclosure.

DESCRIPTION OF THE PREFERRED EMBODIMENTS

For a general understanding of the present invention, reference is made to the drawings. In the drawings, like reference numerals have been used throughout to designate identical elements.

Figure 2:
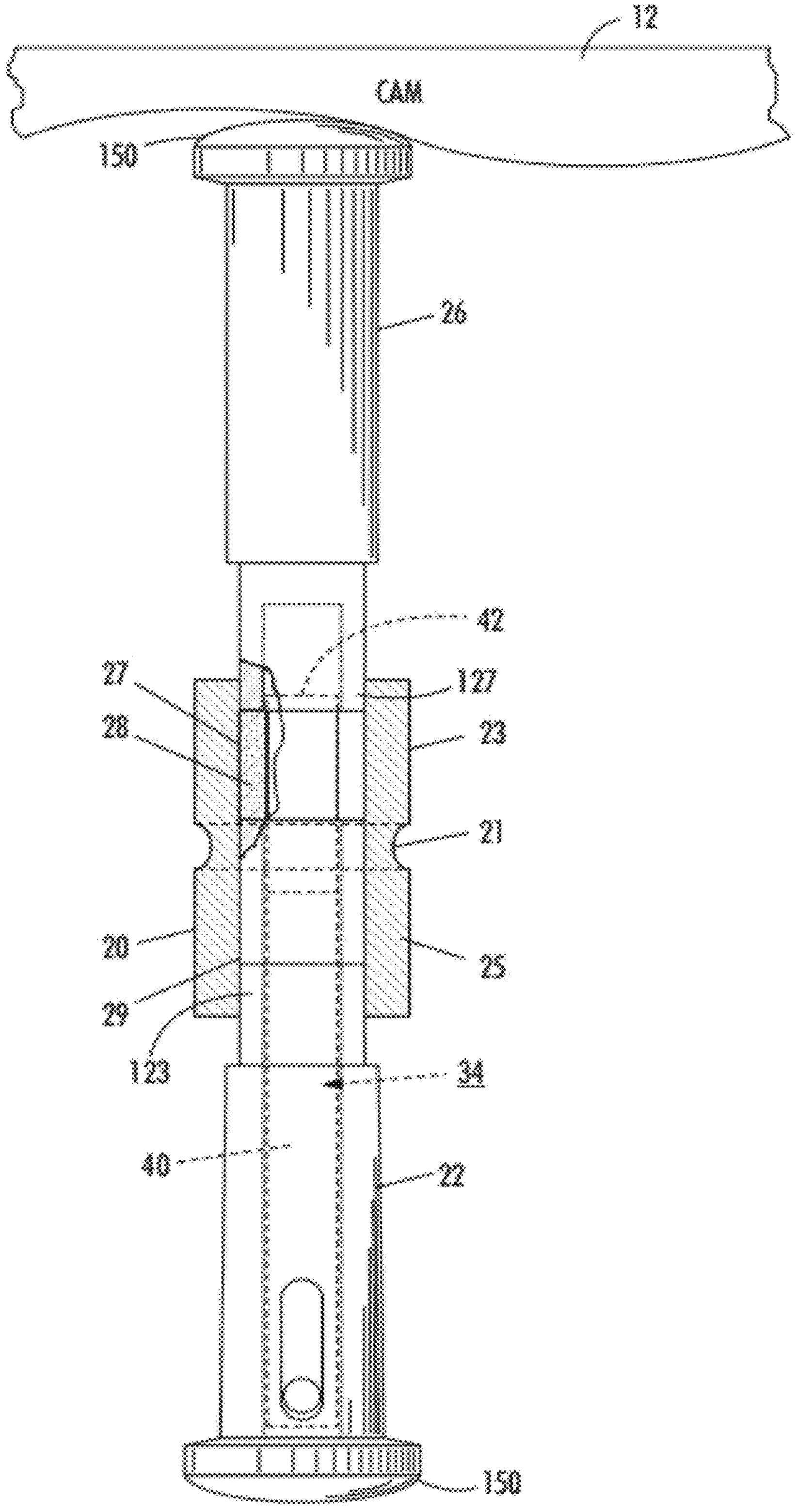
FIG. 2 is a cross-sectional view of the various components of FIG. 1, including aspects of the disclosed embodiments.

Having described the basic operation of the compaction apparatus with respect to FIG. 1, attention is now turned to the particular components of the disclosed embodiments as illustrated in FIGS. 2-16. FIG. 2 is a cross-sectional view of the components similar to FIG. 1, wherein the center pin assembly 34, in accordance with the present invention, is comprised of a center pin base 40 and a center pin tip 42. In one embodiment, center pin tip 42 is preferably comprised of a structural ceramic material such as wear resistant ceramic oxides. Also depicted in FIG. 2 are the compaction punches 22 and 26, each having respective tips that oppose one another to compact material 28. The tips at the ends of the punches 22 and 26, respectively 123, 127, wear over time and may be refurbished in accordance with the embodiments and methods disclosed herein.

One group of wear resistant ceramic oxides is zirconia, which includes the species zirconium oxide, zirconium dioxide, tetragonal zirconia polycrystal (TZP), and partially stabilized zirconia (PSZ). Such partially stabilized zirconia may comprise stabilizers, e.g. yttria ($Y_2O_3$), magnesia (MgO), calcis (CaO), and ceria ($CeO_2$). A second group of wear resistant ceramic oxides is alumina, also known as aluminum oxide ($Al_2O_3$) and corundum. A third group of wear resistant ceramic oxides comprises mixtures of zirconia and alumina, including zirconia toughened alumina (ZTA), comprising between about 5 weight percent $Zr_2O_3$ and about 40 weight percent $Zr_2O_3$.

In addition to ceramics, other materials are suitable for the fabrication of punch tips, and are to be considered within the scope of the disclosed embodiments. Various materials may be considered for use at the tips in the refurbished compaction tools, including tool steels, carbides, etc. Moreover, when the tips are made of a steel or similar alloys, additional treatments such as surface treatments or hardening may be employed to increase the hardness and wear resistance of the tips. Examples of treatments include boronizing, nitriding, diamond coating, chrome plating, etc. For example, one may use a tip comprised of e.g., silicon carbide, tungsten carbide, titanium nitride, or carborundum. In one further embodiment, a tip comprising a pre-hardened steel having a diamond impregnated surface may be used.

Figure 3:
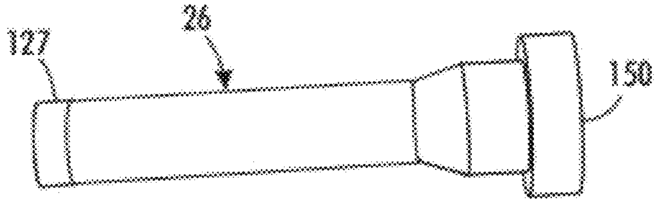
FIGS. 3-6 are illustrative examples of compaction punches that may be used for manufacture of battery components.
Figure 4:
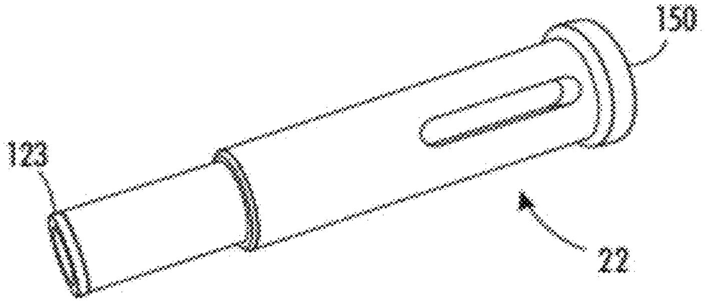
Figure 5:
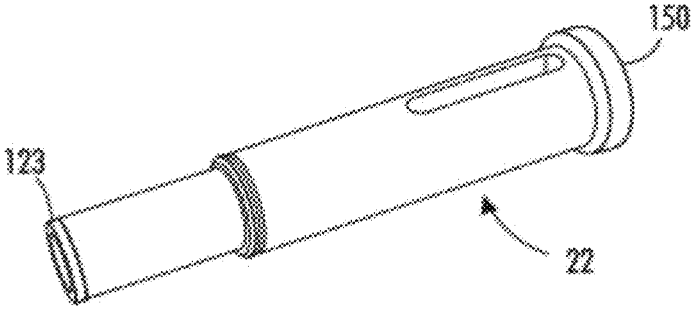

Referring now to FIGS. 3-5, depicted therein are three different styles of compaction punches although it will be appreciated that the techniques described herein may be suitable for not only cylindrical-type punches but for those conventionally used for tabletizing (e.g., oral pharmaceuticals). The punch depicted in FIG. 3 is a compaction punch suitable for manufacture of battery components of a AA size. The punches in FIGS. 4 and 5 are for larger size batteries such as C and D sizes, respectively. Each of the respective punches depicted has a tip or top region 123 (bottom punch tip), 127

(top punch tip) that is exposed, for example, to a cathode battery mixture. The end of the punch opposite the tip, referred to herein as the head, 150, is typically driven in a reciprocating fashion by a cam or similar mechanism (not shown; see FIG. 2; 12) in frictional contact with the punch in order to provide a compressive force to the material being compacted.

Figure 6A:
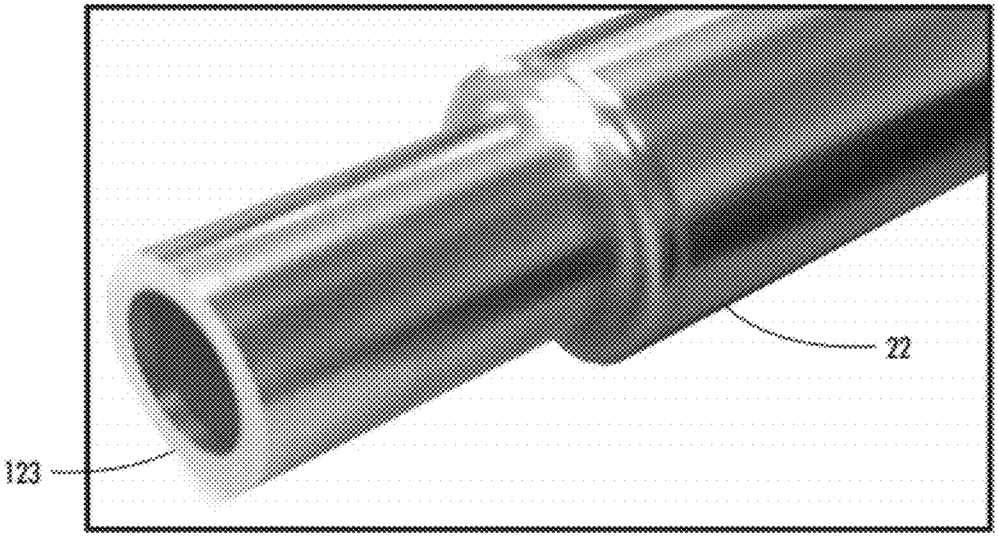
Figure 6B:
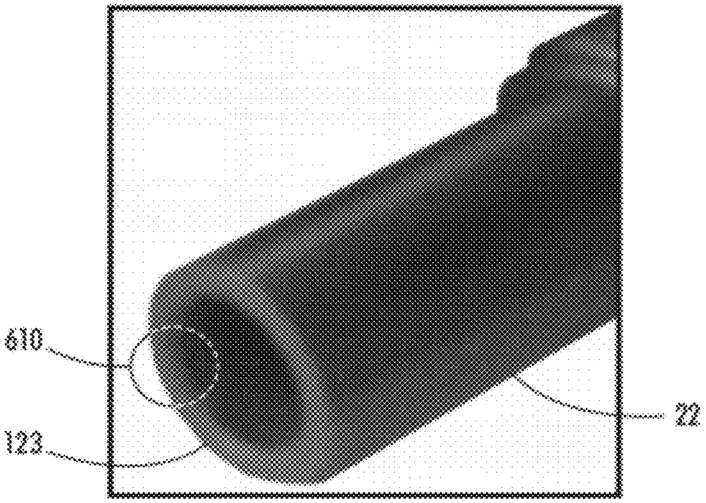

Turning to FIGS. 6A-B, depicted therein are the C and D size compaction punches, respectively, and the end of the rightmost/lower punch can be seen to be worn and damaged (edges within circle 610 are worn and chipped). When the tip becomes worn to the point of replacement, the punch is removed from the production machine and replaced by a punch having a tip that is suitable for use. In the past, such punches were then discarded or scrapped. However, in accordance with the methods and embodiments described in further detail below, the worn portions of the punch may be refurbished so as to produce a less costly replacement punch. In other words, by refurbishing or replacing the worn components without having to make a new punch in its entirety, the replacement can be made in a cost-effective manner.

Figure 7:
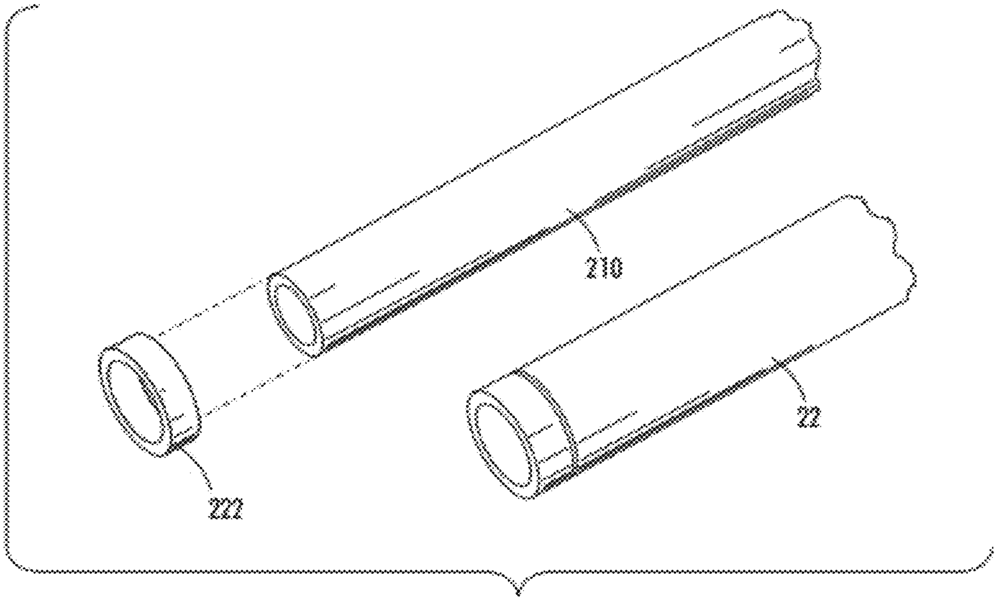
FIGS. 7-11 are sequential illustrations of a method and associated assembly employed for refurbishing.

Referring to FIGS. 7-16, various embodiments and methods for refurbishment of punch tips will now be described. It will be appreciated that in addition to the replacement of tips, the methods described may be similarly applied to wear surfaces on the heads of such punches (the portion in contact with the cam 12). While described relative to punch tips, the methodology is similarly applicable to punch heads as well. It will be further recognized that when refurbishing a compaction tool such as a punch, it may be preferable to refurbish both ends (tip and head) at the same time. FIG. 7 illustrates the components of one embodiment for replacement of a damaged tip on the end of a punch 22. The components include an alignment tool, such as a machined rod 210, where the outside diameter (OD) of the rod is designed to fit within the inside diameter (ID) of the punch. The end of the rod 210 (approx. 10-15 mm) includes a portion having a slightly smaller OD that is designed to receive a replacement tip 222 and to hold the tip in concentric alignment with the punch when the rod 210 is inserted into the punch 22.

Figure 8:
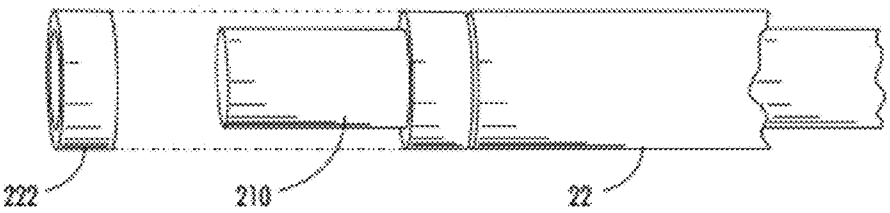
Figure 9:
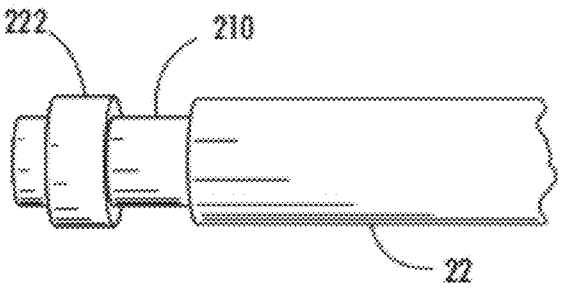
Figure 10:
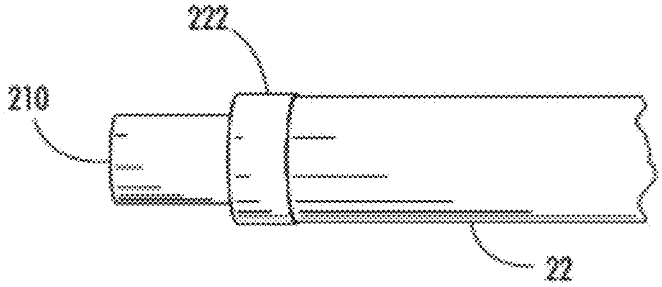

FIG. 8 is an illustration of the rod 210 inserted into the interior of punch 22, where the rod extends slightly out from the end of the punch to receive the replacement tip ring 222 thereon. And, FIG. 9 shows the assembly of FIG. 8, now with a replacement tip 222 placed onto the alignment rod 210. In FIG. 10, the replacement tip has been snugged against a ground end of the punch that is to be refurbished, and the assembly is in condition to permanently affix the replacement tip to the punch base.

It will be appreciated that various techniques and materials may be employed to permanently attach or affix the replacement tip to the punch base. Options that are considered include welding (e.g., micro, abrasion/friction, laser, etc.), gluing/adhesives, brazing or soldering, as well as more conventional techniques such as threads, interference fit and various combinations of such techniques.

Figure 11:
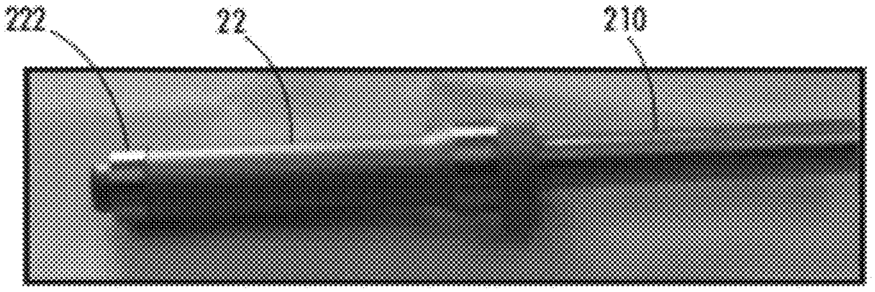

In one embodiment, replacement tip 222 is micro-welded to an end of the punch 22. The punch, having the prior tip removed, was first ground to provide a flat surface for a butt-weld. The mating surfaces of the punch 22 and the replacement tip 222 may each have a small chamfer along the outer edge thereof to facilitate weld penetration as well as to minimize the weld material that must be later ground or removed after the new tip is affixed to the punch. An example of a refurbished punch tip 222 welded to the ground end of a punch is depicted in FIG. 11, where the alignment rod or tool 210 remains within the interior of the punch 22.

Figure 14:
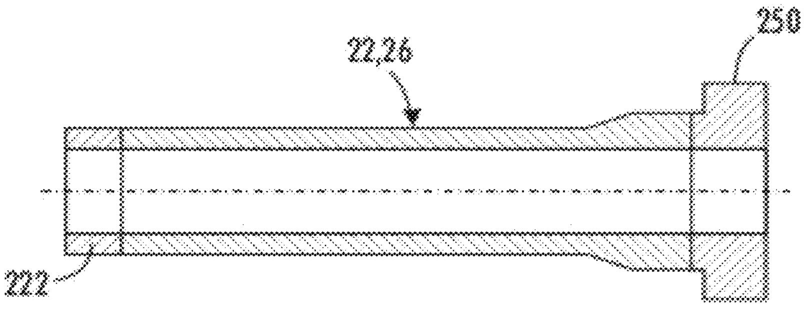
FIG. 14 is a drawing illustrating an exemplary tool with a replacement tip.
Figure 15A:
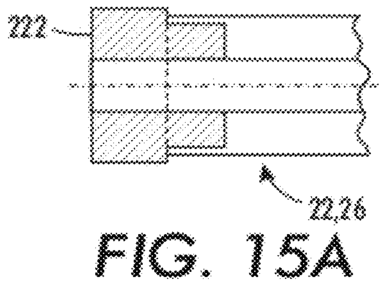
FIGS. 15A-D depict exemplary cross-sections for various abutting surfaces of the replacement ends.
Figure 15B:
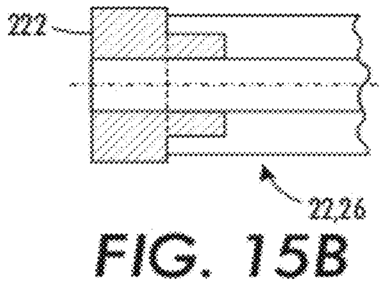
Figure 15C:
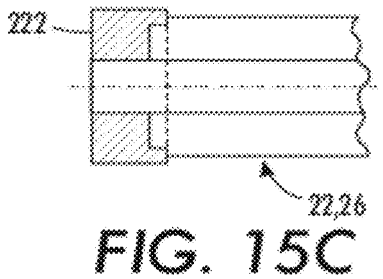
Figure 15D:
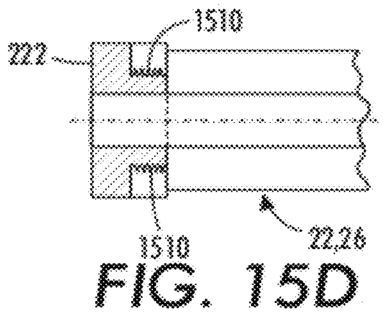

Although described relative to a butt-welded configuration, it will also be appreciated that alternative joint configurations may be employed, such configurations being somewhat dependent upon the nature of the material/method employed to permanently affix the replacement tip to the punch. While FIG. 14 shows a drawing of an exemplary punch 22, 26, the illustrations of FIG. 15A-D depict several alternatives to a simple butt-weld. The cross-sections of FIG. 15A-C, for example, illustrate configurations that include a mating shoulder between the punch and the replacement tip. It will be appreciated that such configurations may be more costly as they require additional machining as compared to a butt weld, but the additional contact surface provided by the shoulder may be advantageous with some methods for affixing the tip to the punch. FIG. 15D is intended to further reflect the possibility of a threaded coupling in region 1510 between the replacement tip and the punch body or base.

FIG. 14 also shows that the punch head may be replaced in a similar fashion. More specifically, replacement head 250 may be permanently affixed to the bottom (rightmost in FIG. 14) end of the punch body 22 or 26 that is being refurbished. It will be appreciated that the replacement head 250 may be attached to the punch body in a manner similar to that described herein relative to the tip. In a refurbishing operation it may also be possible to use a harder or more wear-resistant material for the replacement head, and thereby improve the life of the punch head as well.

Figure 16:
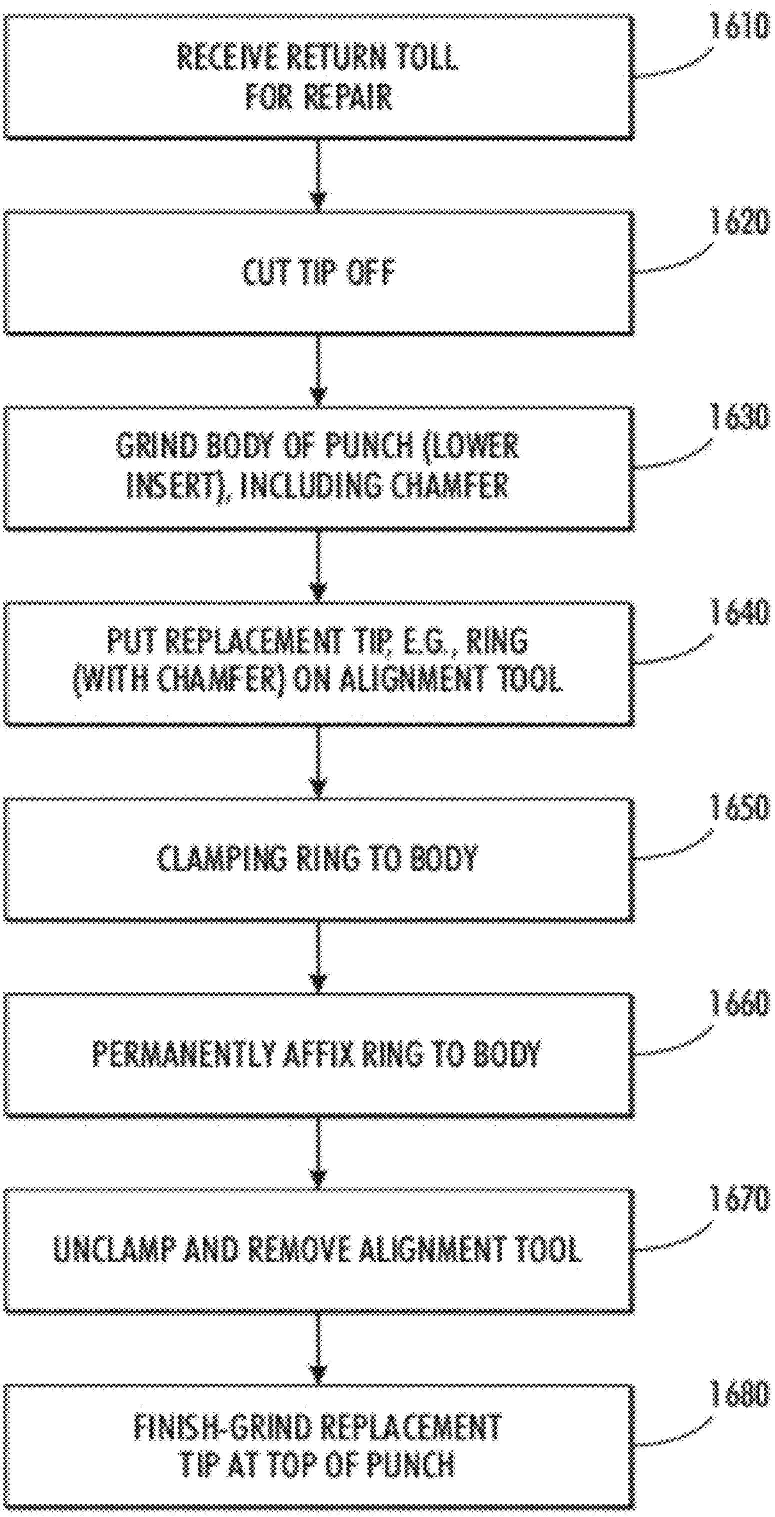
FIG. 16 is a general flowchart depicting steps employed in the refurbishing operation.

Turning briefly to FIG. 16, depicted therein is a general flowchart illustrating a process or method that may be employed to refurbish punches such as those depicted in FIGS. 3-5. The method of refurbishing a compaction punch, starts with receiving the used compaction tool for repair (1610), and then cutting off the tip or worn end of the compaction tool (1620). Although described relative to repair of a worn tip, as noted above, the process may also be used to repair the opposite end of the punch (head), when the head is worn from prolonged contact with a cam or other device that drives the punch. Next, at 1630, the remaining body of the compaction tool (e.g., punch) is ground or otherwise machined to prepare it to receive a replacement part, and optionally placing a chamfer or other profile on one or more mating or adjacent surfaces. When the parts are ready for assembly, the punch is fixtured using an alignment tool or similar device to permit accurate placement of a replacement piece relative to the remaining body (e.g., insert alignment tool into hollow punch body), and a replacement end is placed (opt. also with chamfer) in alignment with the remaining body (e.g., position new tip on the alignment tool) as represented by 1640. It will be appreciated that in addition to the alignment tool depicted, various fixtures may be used to align and hold the replacement tip, and or head, relative to the punch body. The tolerance of the refurbished punch must meet particular specifications and hence it is contemplated that the tip and/or head replacement pieces are sized to permit finish grinding to meet the dimensional requirements of the compaction machine into which the punch will be placed.

Figure 12:
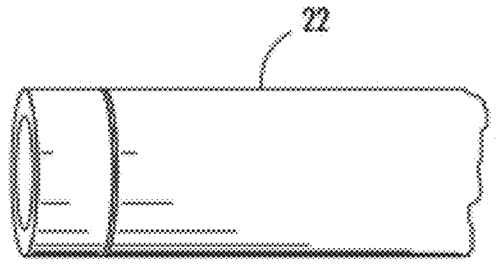
FIGS. 12 and 13 are illustrations of refurbished tools.
Figure 13:
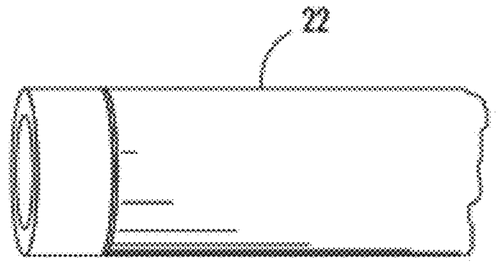

To facilitate micro-welding or brazing, for example, clamping the replacement end (e.g., tip) to the remaining body is employed as represented by 1650, and the replacement piece is permanently affixed to the end of the remaining punch body (1660). After affixing the new tip, unclamping and removal of alignment tool (1670) proceeds, and the replacement end that has been affixed to the body may require finish working (e.g., grind/polish) as represented by 1680. In addition to, or in conjunction with, grinding the tip (and/or head) may also be ground to a desired size/shape and overall length for the punch. And, a honing or diamond polishing of the tip surface of punch (e.g., with diamond paste) may be performed to provide a polished surface. Referring also to FIGS. 12 and 13, depicted therein are two alternative embodiments showing AA battery-size compaction punches with replacement steel and ceramic tips, respectively. In FIG. 12, the steel tip was affixed using a micro-welding technique and a butt-welded joint. In the embodiment of FIG. 13, the ceramic replacement tip was affixed to the punch body using an adhesive.

Although described relative to the tooling employed for the compaction of battery components, the disclosed embodiments are intended to include the use of similar techniques to extend the life of other compaction tools and punches, including, but not limited to tablet compaction, powder metal compaction etc. For example, the process described with respect to FIG. 16 may be employed to refurbish various compaction punches (upper and lower, etc.), wherein tips may be manufactured from longer-wearing ceramic components and fitted to the metal punch base.

It is, therefore, apparent that there has been provided, in accordance with the present invention, a method and apparatus for improving the performance of compaction tooling. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A method of refurbishing a compaction tool, comprising:
- receiving the used compaction tool for repair;
- removing a worn end of the compaction tool;
- grinding the remaining body of the compaction tool;
- aligning the compaction tool with a replacement piece relative to the remaining body to permit accurate placement of the replacement piece;
- placing a replacement end in alignment with the remaining body;
- permanently affixing replacement piece to remaining body; and
- finish working a replaced portion of the compaction tool.

2. The method according to claim 1, wherein the compaction tool is a punch and the worn end is the punch tip.

3. The method according to claim 1, wherein the compaction tool is a punch and the worn end is the punch head.

4. The method according to claim 1, wherein grinding the remaining body of the compaction tool further includes placing a chamfer on at least one surface.

5. The method according to claim 1, wherein the compaction tool is a hollow punch and where aligning the compaction tool with a replacement piece includes inserting alignment tool into a hollow punch body.

6. The method according to claim 5, wherein placing a replacement end in alignment with the remaining body includes positioning the replacement piece on the alignment tool.

7. The method according to claim 6, further including clamping the replacement piece to the remaining body.

8. The method according to claim 7, further including unclamping and removal of the alignment tool.

9. An assembly for refurbishing a compaction punch, including:
- a used body for a compaction punch, said body having a worn end removed therefrom;
- a replacement end to be permanently affixed to the body where the worn end was removed; and
- an alignment tool, operatively associated with the compaction punch to assure alignment of the replacement end and the body prior to and during the permanent affixing of the body and replacement end.

10. The assembly according to claim 9, wherein the worn end is a punch tip.

11. The assembly according to claim 9, wherein the worn end is a punch head.

12. The assembly according to claim 9, wherein said alignment tool is a rod placed through and engaging an inside diameter of the body of the compaction punch.

* * * * *